Jan. 3, 1928.
J. A. STEVENS
1,655,202
DEVICE FOR ABSORBING SHOCKS
Filed Oct. 3, 1925
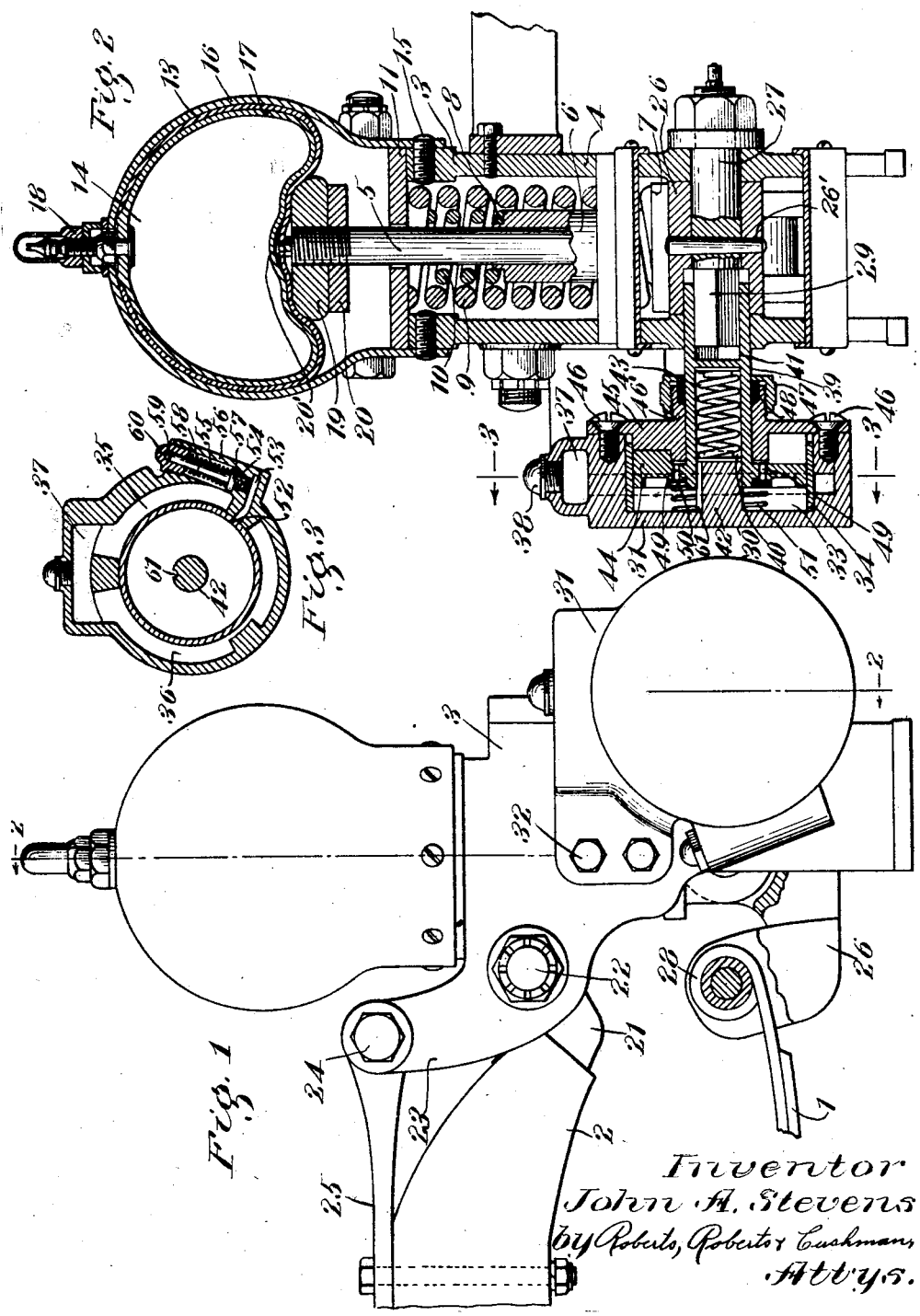
Inventor
John A. Stevens
by Roberts, Roberts & Cushman,
Attys.

Patented Jan. 3, 1928.

1,655,202

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF DELAWARE.

DEVICE FOR ABSORBING SHOCKS.

Application filed October 3, 1925. Serial No. 60,294.

This invention relates to an improvement in shock absorbers for use in conjunction with the usual body springs of a vehicle. The tendency for an automobile to assume a constant undulating movement when traveling at higher rates of speed is well appreciated and is due to the fact that even the best highways contain ripples that cause this undulating movement and make it necessary for an occupant of a vehicle to experience a rising and falling movement which is unpleasant and oftentimes a cause of illness. While known shock absorbers have effectively solved the problem of counteracting and neutralizing shocks so that occupants of a vehicle receive shocks with greatly diminished force and little or no discomfort the inability of shock absorbers to overcome and quickly damp the undulating tendency of the springs and body of the vehicle and return same to the normal position of equilibrium is a serious defect. In fact, prior to this invention shock absorbers if sufficiently resilient and responsive to satisfactorily absorb shocks actually induced and accentuated the undulating tendency of the vehicle.

Objects of this invention are to provide a shock absorber that will readily counteract the shocks received by the vehicle and react to transmit same to the occupants thereof with little or no force and at the same time quickly arrest the movement of the elements set in motion by reason of the shock so that continued relative movement between the springs and body of the vehicle is prevented; to arrange a frictional resistance mechanism in a shock absorbing device so that the normal position of the chassis or body of the vehicle relative to the springs under a normal load is effectively maintained; and to provide a device so simple in its construction that same can be easily applied to an automobile or other vehicle without changing its parts.

Other objects of the invention will be apparent from the detailed description and appended claims hereinafter set forth. For purposes of illustration the invention is shown in the accompanying drawings, in which:

Fig. 1 is a side elevation of the shock absorbing device showing same connected to the spring and body of the vehicle;

Fig. 2 is a vertical sectional view of the device on line 2—2 of Fig. 1; and

Fig. 3 is a vertical sectional view of the frictional resistance mechanism on line 3—3 of Fig. 2.

As illustrated, the numeral 1 designates the usual semi-elliptic spring mounted on the axles of a vehicle and adapted to support the usual chassis or frame 2. In acordance with this invention a shock absorbing device designated as a whole by the numeral 3 is inserted between one end of the leaf spring 1 and the chassis or body 2. The shock absorber 3 comprises a body portion 4 adapted to enclose a plunger rod 5 which is attached to a sleeve 6 at its lower end. The sleeve 6 has on its exterior surface spaced shoulders 7 and 8 forming seats for the coiled springs 9 and 10 respectively. A washer 11 which is rigidly attached to the upper end of the body portion 4 through the medium of screws or other suitable attaching means receives and centers the plunger rod 5 relatively to the spherical casing or cylinder 13 which form a compression chamber 14 surrounding the upper end of the body portion 4 and enclosing said washer 11. The lower end of the casing 13 is rigidly attached to the upper peripheral end of the body portion 4 through a series of screws 15. Enclosed within the casing 13 is an outer casing of fabric 16 containing an inner casing 17 of rubber. The casing 17 is adapted to be inflated through a valve 18 attached to the casing and extending through the top of the cylinder 13. The valve 18 may be of the type commonly employed for inflating pneumatic casings. The upper end of the plunger rod 5 extends through an opening in the washer 11 into the cylinder member 13 and carries an adjustable piston head 19 having a locking nut 20 adapted to lock said piston head in adjusted position on said rod. A screw 20′ may be provided to fasten the rod 5 to the casing 16 if desired. The head 19 bears against the lower side of the casing 16, and further compresses the air in the compression chamber 14 on its upward movement. An eye member 21 is suitably mounted on the end of the frame or chassis 2 of the vehicle and is pivotally attached to a spindle 22 mounted on the inner end of an arm 23 extending from the body portion 4. The arm 23 at its upper end carries a bolt 24 receiving the end of a projection 25 rigidly mounted on the chassis or body 2. An arm 26 is pivotally mounted intermediate its end by a pin 26' extending through the pivot on the lower end of the sleeve 6. One end of the arm 26 is attached to a spindle 27 pivoted in the main body 4 of the device while the opposite end of said arm pivotally receives the eye 28 of the leaf spring 1 permitting free movement between said leaf spring and the shock absorbing element. The parts above described function to effectively counteract and neutralize the shocks received by the vehicle so that shocks are very lightly transmitted to the occupants thereof. However the aforesaid parts alone do not overcome the tendency of the chassis or frame of the vehicle to assume an undulating movement. In fact the pneumatic cushion and auxiliary springs, as has been previously suggested, tend to increase the undulations of the vehicle and for that reason the frictional resistance mechanism hereinafter described peculiarly cooperates with the shock absorber previously described to produce a structure in its entirety which has all of the benefits of the pneumatic shock absorber and overcomes all of its defects. The spindle 27 has a squared extremity 29 cooperating with the frictional resistance mechanism in a manner hereinafter described.

The frictional resistance mechanism designated as a whole by the numeral 30 comprises a casing 31 suitably fastened to the body of the shock absorber through the medium of bolts 32. Casing 31 is provided with an internal recess 33 receiving a cylindrical sleeve 34, fitting the interior walls of the casing but terminating short of the end thereof. The walls of the casing 31 are provided with annular grooves or channels 35 and 36 (Fig. 3) which open into a fluid storage cavity 37, said cavity being provided with a filling opening adapted to be closed by the plug 38. The recess 33, the channels 35 and 36 and the fluid storage cavity 37 are filled with oil or any other suitable fluid. A shaft 39 having cavities 40 and 41 respectively, at each end is adapted to slidably embrace a bearing pin 42 integral with the rear wall of the casing 31 at one end while its other end receives the spindle 27, said cavity receiving the spindle 27 being angular to correspond to the angular extremity 29 of said spindle, so that it is rotatable therewith but adapted to be slidable relatively thereto. A coil spring 43 is located within the cavity 40 and bears against the pin 42 and wall of said cavity and tends to force the shaft 39 to the right in Fig. 2. A piston 44 accurately fitted within sleeve 34 and integral with the shaft 39 is provided with cam surfaces cooperating with corresponding cam surfaces on the interior of the cover 45, said cover 45 being attached to the casing 31 through the medium of the bolts 46. The cover 45 is provided with a stuffing box 46' and cover 47 for holding a packing 48 around shaft 39 whereby leakage of fluid around said shaft is prevented.

The piston 44 is provided with a series of annular ports 49 through which the fluid contained in the cylinder 33 is enabled to pass when displaced by said piston. An annular valve 50 is maintained in contact with the ports 49 on one side of the piston by a coil spring 51 placed between said valve and the wall of casing 31 whereby the ports are closed when the piston 44 moves to the left in Fig. 2 and open to allow a flow of fluid therethrough when the piston is moved in an opposite direction. An opening 52 in sleeve 34 (Fig. 3) constitutes the only means of egress for the fluid confined in the cylinder 33 at the left of the piston in Fig. 2. The opening 52 connects with a passage 53 below a valve seat 54 formed in the casing 2 as shown in Fig. 3. A compression coil spring 55 mounted in a cavity formed in lug 56 of casing 31 serves to hold a valve 57 normally in contact with the valve seat 54. A valve stem 58 extends into a recess 59 in the closure plug 60 fitted to the lug 56, the bottom of said recess engaging the end of said valve stem and thus limiting the movement of the valve 57. The interior of lug 56 is in communication with the annular groove 35 so that any fluid passing through the opening 52 and passage 53 will, if under sufficient pressure raise valve 57 and pass through annular groove 35 to the portion of the recess 33 between the piston 44 and cover 45. The bearing pin 42 is provided with a groove 61 to allow the fluid to pass readily in and out of the cavity 40 containing the spring 43.

The operation of the device is as follows: when the vehicle on which the device is mounted sustains a shock it is transmitted to the leaf spring 1 and plunger rod 5 attached thereto through the arm 26 so that said rod will move upwardly within the compression chamber 13 with the result that the chassis 2 and leaf spring 1 tend to approach each other. On the reacting movement of the plunger rod 5 the chassis 2 and the leaf spring 1 will tend to separate. Any movement of the leaf spring 1 will necessarily impart a movement to the plunger rod 5 and the arm 26 which is mounted on both the leaf spring and the plunger rod. Inasmuch as arm 26 is also attached by pin 26' to the spindle 27 movement of said arm will cause rotation of the spindle and consequently of the shaft 39 rotatable with said spindle. The shaft 39, however, is hindered in its movement by reason of the frictional resistance mechanism whose operation is as follows: assuming that the spring 1 and arm 26 are moving upwardly in response to a shock the spindle 27 is caused to rotate in a clockwise direction as viewed in Fig. 1 transmitting a similar rotational movement to the shaft 39. This clockwise movement of the shaft 39 causes the shaft to move to the left compressing the spring 43 as viewed in Fig. 2 by reason of the fact that the cam surfaces on the piston 44 co-act with the cam surfaces on the stationary cover 45 whereby said piston and shaft are moved to the left from an intermediate position. The movement of the piston 44 to the left exerts a pressure on the spring 51 sufficient to retain the valve 50 in a closed position and causes the fluid contained in the space 33 at the left of the piston to be placed under compression whereby the fluid is forced through the opening 52 and passage 53 causing the valve 57 to open against the tension of the spring 55 and permitting the fluid to return to the grooves or channels 35 and 36 and the portion of the space 33 at the right of the piston 44. On the reacting or downward movement of the piston 5 the spindle 27 and shaft 39 will be rotated in a counterclockwise direction so that the piston 44 and shaft 39 will tend to move to the right as viewed in Fig. 2. This reacting movement permits the valve 50 to open when the pressure of the fluid in the space 33 at the right of the piston is sufficient to overcome the tension of the spring 51 so that a portion of said fluid is forced through the ports 49 into the space 33 at the left of the piston 44 and the first described operation of the frictional resistance mechanism is ready to begin. As viewed in Fig. 2 the position of the shaft 39 on the spindle 27 and piston 44 relative to the cover 45 represents the normal intermediate position of the various movable elements under ordinary load. Any movement of the shaft 39 to the left or right of the position shown in Fig. 2 will obviously be opposed by an increasing retarding force on the part of the frictional resistance mechanism whereby said mechanism not only serves to cooperate with the other elements of the shock absorber to soften and neutralize shocks but is adapted to exercise an increasing resisting force on relative movement between the spring 1 and chassis 2. The maximum retarding influence of the frictional resistance mechanism is exercised on the upstroke of the piston due to the resistance of the mechanism of valve 57. If the ripples on the highway tend to sustain the movable elements of the shock absorbing device 3 in their movement after being set in motion by a shock the frictional resistance mechanism 30 will serve to quickly damp this movement and equilibrize the forces acting on the shock absorbing element. The friction clutch mechanism 30, therefore, not only serves to check the rapid oscillating tendency which normally follows a shock but also overcomes the undulating movement of the vehicle by reason of the intensified force of its drag on the device 3 which gradually increases in intensity when the springs and chassis of the vehicle move relative to one another in response to a shock. The application of the device here shown and described is not restricted to automobiles or other vehicles but the device may be used wherever there are two parts movable relatively to each other by a sudden movement which it is desired to cushion. I do not wish therefore to be limited to the specific form of the device here shown or to the specific application of it to an automobile but merely by the scope of the appended claims.

I claim:

1. A shock absorber adapted to be mounted on a vehicle comprising means for neutralizing and counteracting the shocks received by said vehicle, said means comprising a piston operable to compress air in a collapsible vessel and simultaneously to compress two or more springs, and a frictional resistance mechanism for quickly arresting the relative movement of the parts of the shock absorber to bring them to a state of equilibrium.

2. A shock absorber adapted to be mounted on a vehicle comprising pneumatic means for neutralizing and counteracting the shocks received by said vehicle, and a clutch mechanism for quickly arresting relative movement of the parts of the shock absorber to bring them to a state of equilibrium.

3. A shock absorber adapted to be mounted between the frame and springs of the vehicle comprising a compression chamber containing compressed air, a plunger adapted to oscillate in said chamber, and means acting in parallel with the plunger and compression chamber as a drag on the plunger and exercising its maximum retarding influence on the upstroke thereof quickly to arrest the relative movement of said plunger and chamber.

4. A shock absorber adapted to be mounted between the frame and springs of the vehicle comprising a compression chamber containing compressed air, a plunger adapted to oscillate in said chamber, and means attached to said plunger acting in parallel therewith as a drag thereon and exercising its maximum retarding influence on the upstroke of said plunger quickly to arrest the relative movement of said plunger and chamber.

5. A shock absorber for vehicles comprising a compression chamber containing a vessel filled with a compressible fluid, a plunger rod having a head adapted to oscillate in said chamber and bear on the walls of said vessel, a coiled spring surrounding the plunger rod and adapted to 6. A shock absorber for a vehicle comprising a compression chamber, a plunger rod having a head adapted to oscillate in said chamber, a relatively large coiled spring surrounding the plunger rod and adapted to be compressed on the upward movement thereof, a relatively small coiled spring surrounding the plunger and contained within the large coiled spring, and means acting as a drag on said head and exercising its maximum retarding effect on the upstroke thereof quickly to arrest the relative movement of said head in said chamber.

7. A shock absorber adapted to be mounted between the frame and springs of a vehicle comprising a compression chamber containing compressed air, a plunger adapted to oscillate in said chamber, an arm attached to said plunger and movable therewith, a spindle attached to said arm and rotatable in response to a movement thereof, a cam member engaging said spindle and rotatable therewith, adapted to frictionally engage a complemental cam member on movement of said spindle.

8. A shock absorber for a vehicle comprising a compression chamber, a plunger rod having a head adapted to oscillate in said chamber, a relatively large coiled spring surrounding the plunger rod and adapted to be compressed on the upward movement of the head, a relatively small coiled spring surrounding the plunger and contained within the large coiled spring, a spindle carrying complemental engaging cam members rotatable in response to the movement of said plunger and adapted to act as a drag on the upstroke thereof quickly to arrest the relative movement of said head in said chamber.

9. A shock absorber adapted to be mounted on a vehicle comprising pneumatic means for neutralizing and counteracting the shocks received by said vehicle and fluid displacement means for quickly arresting relative movement of the parts of the shock absorber to bring them into a state of equilibrium, said last mentioned means being operable by a clutch mechanism which is actuated by a relative movement of the vehicle and the springs thereof.

10. A shock absorber for a vehicle comprising means for neutralizing and counteracting the shocks received by said vehicle, and dampening means quickly to arrest the oscillations of the first mentioned means comprising a cylinder filled with a non-compressible fluid, a piston therein, the piston being given a rotary movement by relative movement of the body and springs of the vehicle, the rotary movement causing longitudinal movement by the action of a cam.

11. A shock absorber for a vehicle comprising means for neutralizing and counteracting the shocks received by said vehicle, and dampening means quickly to arrest the oscillations of the first mentioned means comprising a cylinder filled wtih a non-compressible fluid, a cam operated piston therein, a bleed opening in the piston head therein, and a check valve controlling said bleed opening and allowing flow in only one direction therethrough.

12. A shock absorber for a vehicle comprising means for neutralizing and counteracting the shocks received by said vehicle, and dampening means quickly to arrest the oscillations of the first mentioned means comprising a cylinder filled with a non-compressible fluid, a cam operated piston therein, a bleed opening in the piston head, a check valve controlling said bleed opening, and allowing flow in only one direction therethrough, and a by-pass around said piston controlled by a spring pressed valve, whereby the pressure of the fluid passing through the valve is controlled by the tension of the spring.

13. A shock absorber for a vehicle comprising means for neutralizing and counteracting the shocks received by said vehicle, and dampening means quickly to arrest the oscillations of the first mentioned means comprising a cylinder filled with a non-compressible fluid, a piston therein, the piston being given a rotary movement by relative movement of the body and springs of the vehicle, the rotary movement causing longitudinal movement by the actions of a cam, a bleed opening in the piston head, a check valve controlling the bleed opening and allowing flow of fluid in only one direction therethrough, and a valve controlled bypass around said piston providing the sole path for flow of fluid in the direction opposite to the flow past said check valve.

14. A shock absorber for a vehicle comprising means for neutralizing and counteracting the shocks received by said vehicle, and dampening means quickly to arrest the oscillations of the first mentioned means comprising a cylinder filled with a non-compressible fluid, a piston therein, and at least two one-way valves controlling the passage of fluid from one side of the piston to the other, one operating in either direction.

15. A shock absorber for a vehicle comprising means for neutralizing and counteracting the shocks received by said vehicle, and dampening means quickly to arrest the oscillations of the first mentioned means comprising a cylinder filled with a non-compressible fluid, a piston therein, at least two one-way valves controlling the passage of fluid from one side of the piston to the other, one operating in either direction, and springs holding said one-way valves in place whereby the pressure of fluid required to cause a flow through the valves is dependent on the tension of said springs.

16. An apparatus for absorbing the shocks caused by the relative movement of two members comprising means for neutralizing and counteracting the shocks caused by the relative movement of said members, and a clutch mechanism for quickly arresting relative movement of the parts of the shock absorbing mechanism to bring them to a state of equilibrium.

17. An apparatus for absorbing the shocks caused by the relative movement of two members comprising a compression chamber adapted to be fixed to one of said members, a plunger rod carried by the other of said members and having a head adapted to oscillate in said chamber, a relatively large coiled spring surrounding the plunger rod and adapted to be compressed on the upward movement thereof, a relatively small coiled spring surrounding the plunger and contained within the large coiled spring, and means acting as a drag on said head and exercising its maximum retarding effect on the upstroke thereof to quickly arrest the relative movement of said head in said chamber.

18. An apparatus for absorbing the shocks caused by the relative movement of two members comprising a compression chamber containing a compressible fluid, said chamber adapted to be fixed to one of said members, a plunger adapted to be carried by the other of said members and to oscillate in said chamber, an arm attached to said plunger and movable therewith, a spindle attached to said arm and rotatable in response to a movement thereof, a cam member engaging said spindle and rotatable therewith, adapted to frictionally engage a complemental cam member on movement of said spindle.

19. An apparatus for absorbing the shocks caused by the relative movement of two members comprising a compression chamber adapted to be fixed to one of said members, a plunger rod adapted to be carried by the other of said members having a head adapted to oscillate in said chamber, a relatively large coiled spring surrounding the plunger rod and adapted to be compressed on the upward movement of the head, a relatively small coiled spring surrounding the plunger and contained within the large coiled spring, a spindle carrying complemental engaging cam members rotatable in response to the movement of said plunger and adapted to act as a drag on the upstroke thereof quickly to arrest the relative movement of said head in said chamber.

Signed by me at Lowell, Massachusetts, this 28th day of September, 1925.

JOHN A. STEVENS.